(12) United States Patent
Virzi et al.

(10) Patent No.: US 10,992,844 B2
(45) Date of Patent: Apr. 27, 2021

(54) VIDEO IMAGING AND INERTIAL SENSOR DATA COUPLING

(71) Applicant: Nauto, Inc., Palo Alto, CA (US)

(72) Inventors: Joseph S. Virzi, Fremont, CA (US); Newfel Harrat, Burlingame, CA (US); Rakesh Ranjan, Foster City, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 16/983,919

(22) Filed: Aug. 3, 2020

(65) Prior Publication Data

US 2021/0037167 A1 Feb. 4, 2021

Related U.S. Application Data

(60) Provisional application No. 62/882,314, filed on Aug. 2, 2019.

(51) Int. Cl.
| | |
|---|---|
| *H04N 5/12* | (2006.01) |
| *H04N 5/05* | (2006.01) |
| *H04N 5/14* | (2006.01) |
| *G06T 1/20* | (2006.01) |
| *H04N 5/06* | (2006.01) |

(52) U.S. Cl.
CPC ............. *H04N 5/12* (2013.01); *G06T 1/20* (2013.01); *H04N 5/05* (2013.01); *H04N 5/06* (2013.01); *H04N 5/144* (2013.01)

(58) Field of Classification Search
CPC .. H04N 5/12; H04N 5/04; H04N 5/05; H04N 5/06; H04N 5/144; H04L 7/02; H04L 7/04; G06T 1/20
USPC ........ 348/500, 521, 524, 529, 531, 536, 537, 348/540, 547; 375/354, 355, 362
See application file for complete search history.

(56) References Cited

U.S. PATENT DOCUMENTS

2018/0188384 A1* 7/2018 Ramanandan .......... G01S 19/53

* cited by examiner

*Primary Examiner* — Sherrie Hsia
(74) *Attorney, Agent, or Firm* — Vista IP Law Group, LLP

(57) ABSTRACT

Introduced here are synchronization modules designed to integrate streams of data acquired from multiple sources in a precise, repeatable manner. To improve the usability of data acquired from multiple sources, a synchronization module can tightly couple streams of data received from these sources so that the data is temporally aligned. For example, a synchronization module may tightly couple motion data generated by a motion sensor with location data generated by a location sensor and image data generated by an image sensor in a manner that lessens the incurrence of software overhead.

20 Claims, 6 Drawing Sheets

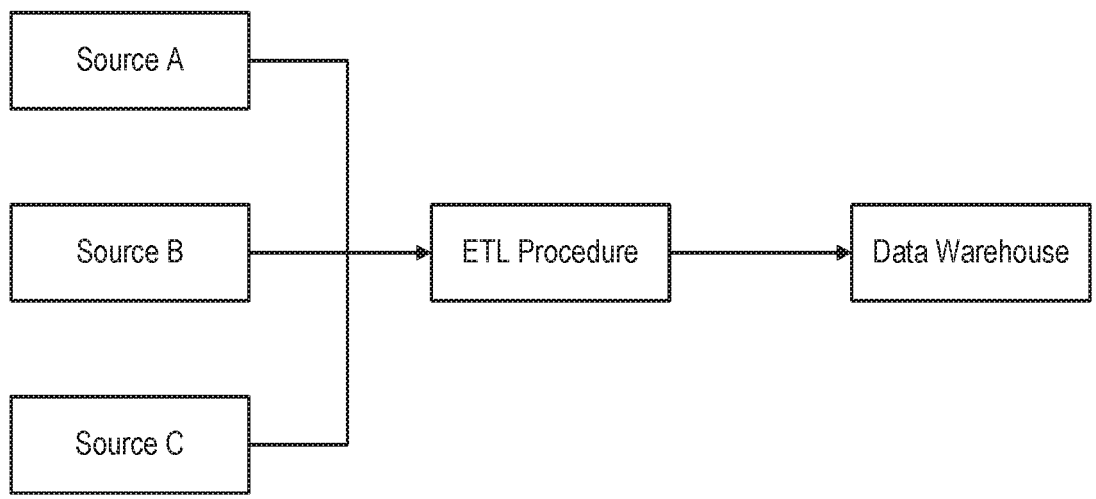
Data Warehousing Approach
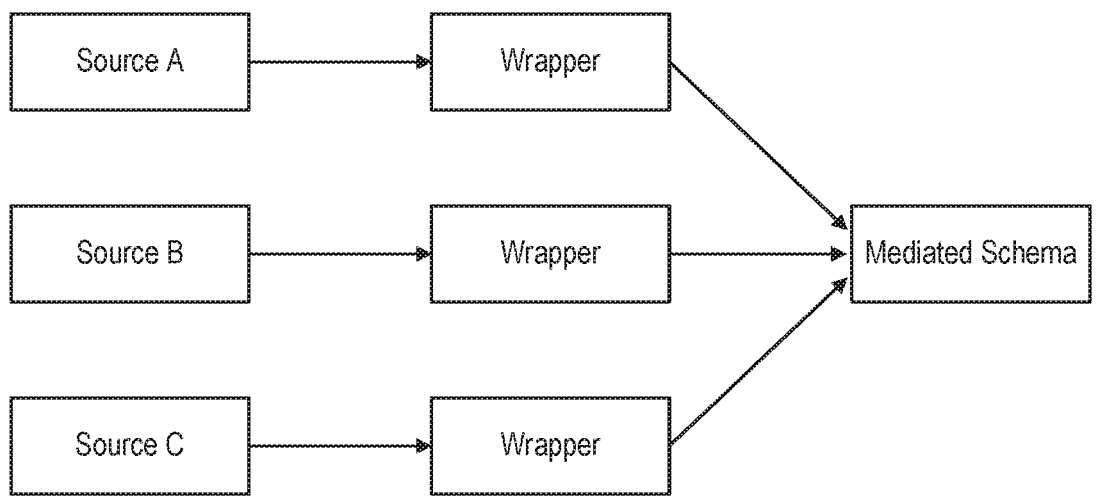
Mediated Schema Approach
FIGURE 1

500

501
Calibrate field of view (FoV) of camera to a known maximum distance at which an object can be detected 502
Capture a series of images that include the moving object at a known rate 503
Estimate a rate at which the size of the moving object is changing by examining the series of images 504
Compute a speed at which the camera is moving 505
Calculate a speed of the object based on the rate at which the size of the object is changing and the speed at which the camera is moving

VIDEO IMAGING AND INERTIAL SENSOR DATA COUPLING

RELATED APPLICATION DATA

This application claims priority to, and the benefit of, U.S. Provisional Patent Application No. 62/882,314, filed on Aug. 2, 2019. The entire disclosure of the above application is expressly incorporated by reference herein.

TECHNICAL FIELD

The subject disclosure relates to synchronization modules able to temporally couple data acquired from multiple sources in a manner that lessens the incurrence of software overhead.

BACKGROUND

Entities have developed various hardware- and software-based technologies to process video and inertial sensor data. Historically, these technologies have employed batch processing in which code representative of rules is periodically executed on batches of data acquired from a source. While batch processing represents an efficient way to process large amounts of data, this approach is unsuitable for processing data related to time-sensitive scenarios.

Accordingly, entities have begun embracing processing data as it is streamed from a source. This approach may be referred to as "real-time processing." Real-time processing is normally employed to address time-sensitive scenarios by obtaining the insights needed to identify the most appropriate action(s) as quickly as possible. However, real-time processing is becoming increasingly difficult to employ in some time-sensitive scenarios due to the staggering amounts of data that must be processed.

SUMMARY

A device includes: a camera configured to capture a series of images, transfer the images to a processor, and generate a first synchronization signal that includes a series of discrete values, wherein each discrete value in the series of discrete values is associated with a transfer of a corresponding image in the series of images from the camera to the processor; an inertial sampling circuit configured to receive as input the first synchronization signal generated by the camera, and generate as output a series of motion measurements indicative of motion of the device; a Global Positioning System (GPS) receiver configured to generate a second synchronization signal; and a microcontroller configured to compute a phase difference between the first synchronization signal and the second synchronization signal, append the phase difference to the motion measurements to create a series of fused data values, and transfer the fused data values to the processor.

Optionally, the images in the series form at least a part of a video file.

Optionally, the GPS receiver is further configured to: generate a series of location values indicative of location of the device, and produce a series of speed values by establishing, for each location value in the series of location values, a speed at which the device is moving.

Optionally, the processor is configured to receive the series of images from the camera, the series of fused data values from the microcontroller, and the series of speed values from the GPS receiver, and wherein the processor is configured to associate each image in the series of images with (1) at least one of the motion measurements in the series of fused data values and (2) at least one of the speed values.

Optionally, the inertial sampling circuit comprises an accelerometer, a gyroscope, a magnetometer, or any combination thereof.

Optionally, the inertial sampling circuit includes an accelerometer and a gyroscope, and wherein the series of motion measurements includes a first set of measurements generated by the accelerometer and a second set of measurements generated by the gyroscope.

Optionally, each motion measurement in the series of motion measurements is generated by the inertial sampling circuit in response to receiving a corresponding one of the discrete values in the first synchronization signal from the camera.

Optionally, the inertial sampling circuit is configured to generate the motion measurements at a frequency of at least 100 kilohertz (kHz).

Optionally, the microcontroller is configured to determine the phase difference between the first synchronization signal and the second synchronization signal using a counter having a resolution of at least 32 nanoseconds (ns).

A synchronization module includes: a processor; and a microcontroller configured to: receive a synchronization signal that includes a series of discrete values from a camera, wherein each discrete value in the series of discrete values is associated with a transfer of an image in a series of images generated by the camera, receive a pulse-per-second (PPS) signal from a Global Positioning System (GPS) receiver, compute a phase difference between the synchronization signal and the PPS signal, append the phase difference to a series of motion measurements generated by a motion sensor configured to use the synchronization signal as input, and transfer the motion measurements to the processor.

Optionally, the motion sensor comprises an accelerometer.

Optionally, the motion sensor is one of multiple motion sensors configured to use the synchronization signal as input; and wherein the series of motion measurements include a first set of measurements generated by the one of the motion sensors, and a second set of measurements generated by another one of the motion sensors.

Optionally, the microcontroller is configured to receive the first and second sets of measurements via different input pins.

Optionally, the processor is configured to: receive the series of images generated by the camera, receive a series of speed values generated by the GPS receiver, receive the series of motion measurements from the microcontroller, and associate each image in the series of images with (1) at least one of the motion measurements and (2) at least one of the speed values.

Optionally, the synchronization module is configured to store the series of images, the series of motion measurements, and the series of speed values in a profile.

Optionally, the profile is associated with an individual captured in at least one image in the series of images.

A method for coupling streams of data to be analyzed in real time, includes: receiving, by a microcontroller, a synchronization signal that includes a series of discrete values, wherein each discrete value in the series of discrete values is associated with a transfer of an image in a series of images generated by a camera; receiving, by the microcontroller, a pulse-per-second (PPS) signal generated by a Global Positioning System (GPS) receiver; computing, by the microcontroller, a phase difference between the synchronization signal and the PPS signal; receiving, by the microcontroller, a series of motion measurements generated by an inertial sampling circuit configured to use the synchronization signal as input; creating, by the microcontroller, a series of fused data values by appending the phase difference to the series of motion measurements; transferring, by the microcontroller, the fused data values to a processor.

Optionally, each fused data value in the series of fused data values includes a 16-bit signed integer indicative of a corresponding one of the motion measurements, and a 12-bit marker indicative of a time at which the synchronization signal was registered by the inertial sampling circuit.

Optionally, the microcontroller employs a counter having a resolution of at least 32 nanoseconds (ns) to compute the phase difference between the synchronization signal and the PPS signal. In some embodiments, the counter may be a hardware counter.

Optionally, the method further includes: receiving, by the processor, the series of images generated by the camera; receiving, by the processor, a series of speed values generated by the GPS receiver; receiving, by the processor, the series of fused data values from the microcontroller; and associating, by the processor, each image in the series of images with (1) at least one of the fused data values and (2) at least one of the speed values.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. These drawings depict only exemplary embodiments and are not therefore to be considered limiting in the scope of the claimed invention.

FIG. 1 includes a high-level illustration of various approaches to data integration.

FIG. 5 includes a flow diagram of a process for estimating the velocity of an object based on images created by a single camera.

DETAILED DESCRIPTION

Figure 2:
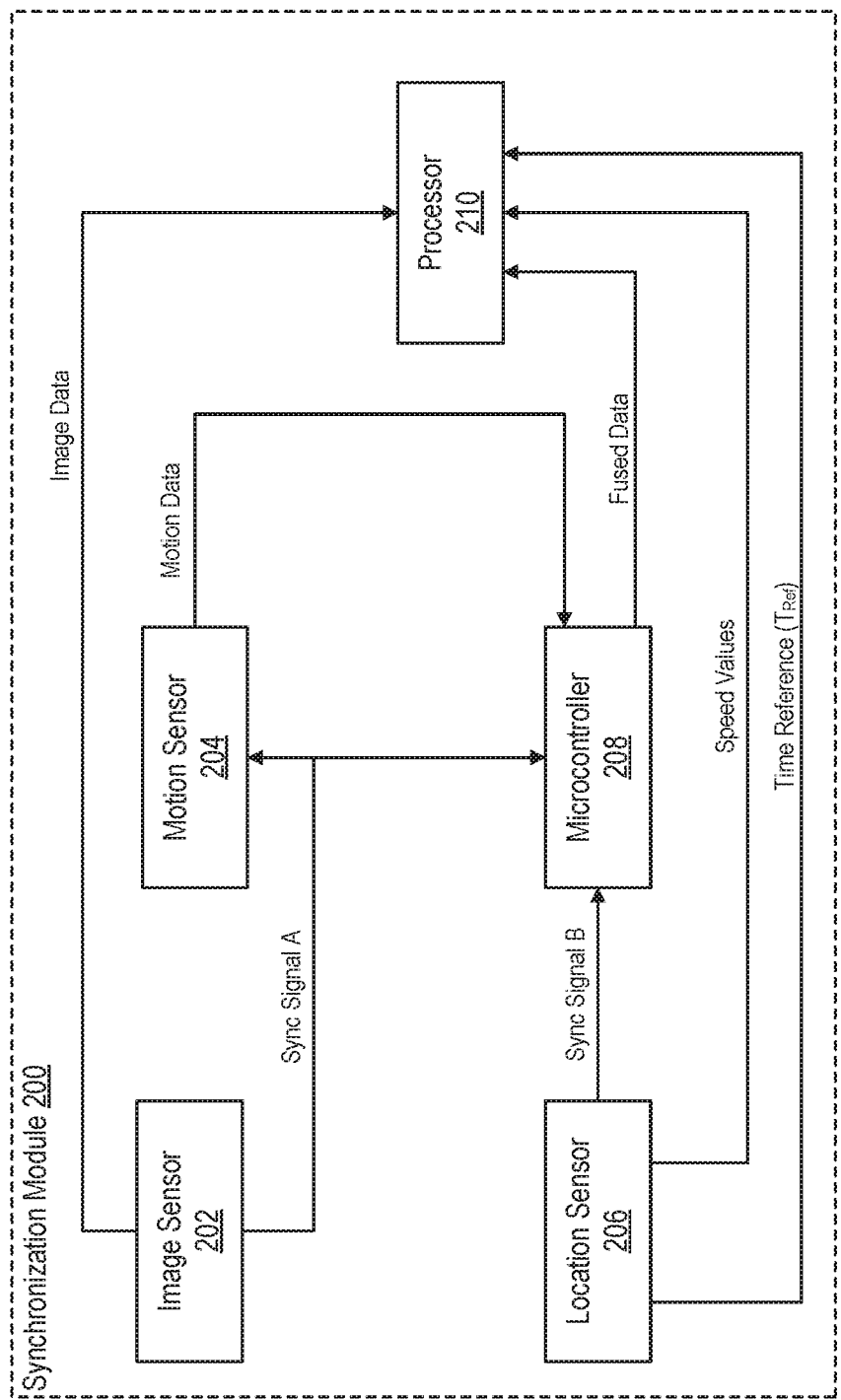
FIG. 2 is a high-level functional block diagram illustrating an example of a synchronization module able to temporally couple data acquired from multiple sources.

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Real-time processing deals with data that is processed with minimal latency to produce near-instantaneous output. Entities have begun employing real-time processing to address time-sensitive scenarios for which batch processing is unsuitable. For instance, real-time processing has been used in the context of financial transactions, traffic control, etc.

Real-time processing can be difficult to implement in some time-sensitive scenarios, however. One issue is the difficulty in identifying the data best suited for analysis at any given moment, especially given the staggering amounts of data that may be under consideration. Consider, for example, an observation system designed to determine the distraction level of a driver to promote safer operation of a vehicle by quantifying the riskiness of activities performed by the driver. The observation system may include camera(s), microphone(s), location sensor(s) such as Global Positioning System (GPS) receivers, and inertial sensor(s) such as accelerometer(s) and/or gyroscope(s) that produce data which must be analyzed in real time if unsafe activities are to be addressed. The data produced by these components is normally streamed to a computational system that includes a processor (e.g., one or more processing units, one or more hardware processors, one or more general purpose processors, one or more graphical processing units, one or more neural network processing units (NNPUs), etc., or any combination of the foregoing) that is responsible for identifying an appropriate output (e.g., an audible alert intended to prompt the driver to cease performance of an activity, or an entry in a log of unsafe activities performed by the driver).

To identify the most appropriate output, the processor may attempt to analyze data acquired from one source in conjunction with data acquired from another source. For example, if the processor discovers that the driver is presently texting based on an analysis of images generated by the camera, the processor may seek to determine the speed at which the vehicle is presently moving. This can be difficult, however, since the processor normally analyzes data acquired from multiple sources in a siloed manner due to the difficulty of integrating the data in real time.

Introduced here, therefore, are synchronization modules designed to integrate streams of data acquired from multiple sources in a time coherent and precise, repeatable manner. To improve the usability of data acquired from multiple sources, a synchronization module can tightly couple streams of data received from these sources so that the data is temporally aligned. For example, a synchronization module may tightly couple motion data generated by a motion sensor with location data generated by a location sensor and image data generated by an image sensor in a manner that lessens the incurrence of software overhead.

Embodiments may be described in the context of real-time observation of an individual. For example, a synchronization module may be part of an observation system designed to monitor a driver of a vehicle, an agent at a call center, etc. However, those skilled in the art will recognize that these features are equally applicable to other contexts, such as controlling autonomous vehicles.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, firmware components, and/or hardware components. Modules are functional components that can generate useful output(s) based on specified input(s). For instance, a module may produce an output (e.g., a classification of an action performed by an individual under observation) based on multiple inputs (e.g., data generated by a camera, GPS receiver, etc.).

The term "microcontroller" refers to one or more processing units, which may be implemented using hardware (e.g., integrated circuit), software, or a combination of both. In some embodiments, a microcontroller may include one or more CPU and a memory.

The term "processor" refers to one or more processing units, such as one or more hardware processors (e.g., integrated circuit), one or more software modules, or combination of both.

As used in this specification, the term "image" is not limited to an image that is displayed, and may refer to an image that is not displayed (e.g., an image in data or digital form that is stored).

Also, as used in this specification, the term "signal" may refer to one or more signals. By means of non-limiting examples, a signal may include one or more data, one or more information, one or more signal values, one or more discrete values, etc.

In addition, as used in this specification, the term "real time" refers to a time in which data is processed (such as within 1 second, within 0.5 second, within 0.1 second, within 0.01 seconds, within milliseconds, etc.) so that the result is available virtually or almost immediately.

Technology Overview

FIG. 1 includes a high-level illustration of various approaches to data integration. The term "integration" refers to the concept of combining data acquired from different sources to provide a more unified view of an object under consideration. Integration has been employed with increasing frequency as the volume of data to be examined (and the need to share that data) exploded.

Issues with combining data acquired from different sources (also referred to as "heterogenous sources" or "information silos") have existed for some time. For example, beginning in the 1980s, entities began developing software-based technologies for improving the interoperability of heterogenous databases. The most popular approach (referred to as "data warehousing") involved extracting, transforming, and loading data from heterogenous sources into a single-view schema (referred to as a "data warehouse") so that the data becomes compatible. Data warehousing can be applied in a straightforward manner since the data is already physically reconciled in queryable repositories. Data warehousing is less feasible for data that must be analyzed in real time, however, because the extract-transform-load (ETL) procedure must be continuously re-executed for synchronization to occur.

Over the last decade, the trend in integration has favored loosening the coupling between data acquired from heterogenous sources. Generally, this is accomplished by providing a unified query interface to access data in real time over a mediated schema. While this approach allows data to be retrieved directly from the original source in real time, the loosened coupling causes the relationship between this data to become less clear. But in many scenarios establishing the relationship between data acquired from heterogenous sources is critical to producing the most appropriate output.

Introduced here are synchronization modules designed to address the deficiencies of these conventional technologies. In contrast to these conventional technologies, the synchronization modules described herein employ hardware and software to temporally couple streams of data acquired from multiple sources in real time. Such action improves the usability of the data, for example, by allowing a processor to simultaneously consider data acquired from multiple sources.

For instance, in some embodiments, the synchronization module is part of an observation system designed to determine the distraction level of a driver to promote safer operation of a vehicle by quantifying the riskiness of activities performed by the driver. By temporally coupling different types of data (e.g., images generated by a camera and information on the speed of the vehicle), the synchronization module can provide a more holistic view of the situation. A synchronization module could be configured to process various types of data. For example, a synchronization module may temporally couple motion data generated by a motion sensor, location data generated by a location sensor, and image data generate by an image sensor with minimal software overhead.

FIG. 2 is a high-level functional block diagram illustrating an example of a synchronization module 200 able to temporally couple data acquired from multiple sources. The synchronization module 200 includes one or more image sensors 202, one or more motion sensors 204, a location sensor 206, a microcontroller 208, and one or more processors 210 (e.g., one or more processing units, central processing unit(s), graphical processing unit(s), micro-controller(s), neural network processing unit(s), etc.). Embodiments of the synchronization module 200 may include some or all of these components, as well as other components not shown here. For example, some embodiments of the synchronization module 200 include multiple image sensors designed to measure light in different ranges of electromagnetic radiation (e.g., the human-visible spectrum and the infrared spectrum).

As noted above, the synchronization module 200 may be part of an observation system designed to determine the distraction level of a driver of a vehicle by quantifying the riskiness of an activity performed by the driver. Accordingly, the image sensor 202 may generate image data representative of a series of images of the driver. The image sensor 202 may be, for example, a camera that is equipped with a complementary metal-oxide-semiconductor (CMOS) sensor assembly capable of generating images of an environment (e.g., the interior of a vehicle) by detecting electromagnetic radiation in the visible range.

As the image sensor 202 generates images, these images (which are parts of a video) can be streamed to the processor 210 via a hardware block (also referred to as an "interface") that acts as an output mechanism. As these images are transferred to the processor 210, the image sensor 202 produces a synchronization signal ("Sync Signal A") that is accessible via the interface. The synchronization signal may include a series of discrete signal values, and each discrete signal value in the series of discrete signal values may be associated with the transfer of an image to the processor 210.

Assume, for example, that the image sensor 202 generates 30 images per second over the course of a 10-second interval to produce 300 images. These images are transferred to the processor 210 in real time. Each time an image is transferred to the processor 210 by the image sensor 202, the image sensor 202 may generate a discrete signal value that is output in the form of the synchronization signal. While there will be a short delay (e.g., on the order several nanoseconds) between the time at which an image is generated and the time at which an image is transferred, the synchronization signal output by the image sensor will include roughly 300 discrete signal values over the 10-second interval.

As shown in FIG. 2, the motion sensor 204 may be configured to use this synchronization signal as input to generate motion data indicative of motion of the synchronization module 200. Thus, the synchronization signal may be used to strobe the motion sensor 204, thereby causing it to measure motion of the synchronization module 200. Such a configuration ensures that motion values generated by the motion sensor 204 are sampled with an aligned phase marked by the synchronization signal. One example of a motion sensor is an inertial sensor, such as an accelerometer, gyroscope, or magnetometer. Motion data generated by the motion sensor 204 includes a series of motion values in a temporal order. Because the motion sensor 204 uses the synchronization signal output by the image sensor 202 as input, each motion value is generated by the motion sensor 204 in response to receiving the synchronization signal from the image sensor 202. Thus, the transfer rate of the image sensor 202 may be substantially identical to the sample rate of the motion sensor 204. The motion sensor 204 may have a sample rate of at least 100 hertz (Hz), 200 Hz, 300 Hz, etc.

The location sensor 206 can be configured to generate location data indicative of the geographical location of the synchronization module 200. One example of a location sensor is a Global Positioning System (GPS) receiver capable of determining the geographical location of the synchronization module 200 based on information received from one or more GPS satellites. The location data includes a series of location values indicative of the location of the synchronization module 200 at corresponding points in time.

In some embodiments, the location sensor 206 is also responsible for estimating the speed at which the synchronization module 200 is moving. The location sensor 206 may produce a series of speed values by calculating, for each location value in the series of location values, a speed value based on (i) the distance between the location value under consideration and the preceding location value and (ii) the frequency with which location values are generated by the location sensor 206. For example, to calculate the speed value for a given location value, the location sensor 206 can divide the distance between the given location value and the preceding location value by the time that elapsed between these location values.

Moreover, the location sensor 206 may produce a synchronization signal ("Sync Signal B") on a periodic basis. For example, if the location sensor 206 is a GPS receiver, the location sensor 206 will output a pulse-per-second (PPS) signal for synchronization purposes. The location module 206 may also produce a time reference ($T_{Ref}$) signal that is synchronized with a system clock (not shown). The system clock (also referred to as a "clock module") is responsible for issuing a steady, high-frequency signal that synchronizes the various components of the synchronization module 200. In some embodiments, the clock module is part of the synchronization module 200.

As shown in FIG. 2, the synchronization signal output by the image sensor 202 and the synchronization signal output by the location sensor 206 can be fed into the microcontroller 208. Upon receiving these synchronization signals, the microcontroller 208 can compute the phase difference (also referred to as the "phase offset") between them. The microcontroller 208 may compute the phase difference between these synchronization signals using a counter with a resolution of at least 32 nanoseconds (ns). The counter may be, for example, a two-phase counter with two input terminals for receiving signals whose phases are to be compared. Because the synchronization module 200 uses a microcontroller 208 to compute the phase difference between these synchronization signals, the computation does not incur any software overhead. The microcontroller 208 can append the phase difference (or metadata indicative of the phase difference) to the motion data generated by the motion sensor 204 to create fused data, and then the microcontroller 208 can transfer the fused data to the processor 210. Each motion value in the series of motion values representative of the motion data may be associated with a separately calculated phase difference.

The processor 210, meanwhile, may receive the image data from the image sensor 202, the series of speed values and $T_{Ref}$ signal from the location sensor 206, and the fused data from the microcontroller 208. As noted above, the image data may be representative of a series of images captured over time. Accordingly, the processor 210 may associate each image in the series of images with a speed value in the series of speed values. Moreover, the processor 210 may associate each image in the series of images with a value in the fused data. The appropriate vale in the fused data may be readily identifiable by the processor 210 since, as noted above, the motion sensor 204 uses the synchronization signal output by the image sensor 202 as input to generate the motion values included in the fused data. Accordingly, each image generated by the image sensor 202 can be associated with a speed value generated by the location sensor 206 and a motion value generated by the motion sensor 204.

Figure 3:
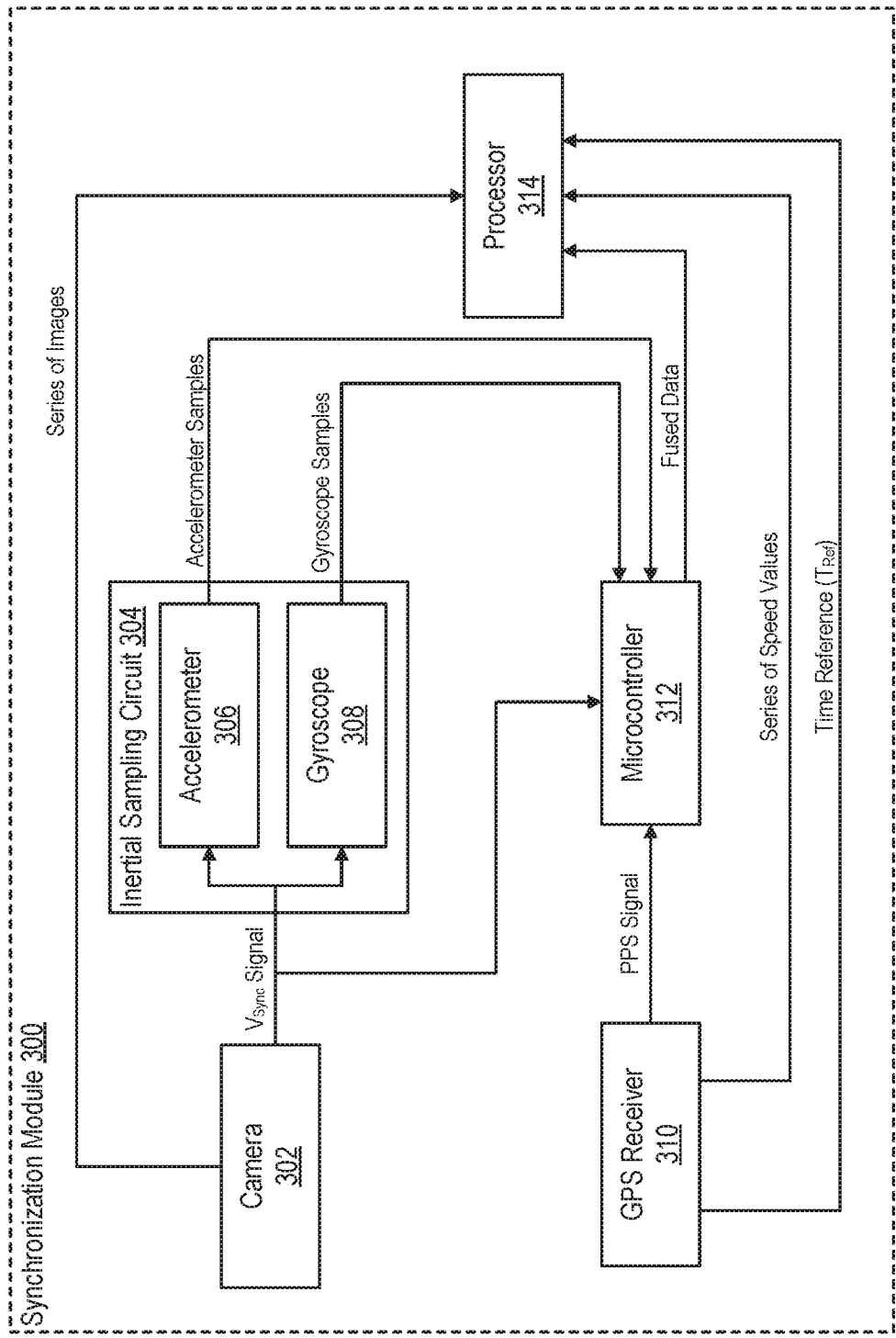
FIG. 3 is a high-level functional block diagram illustrating another example of a synchronization module able to temporally couple data acquired from multiple sources.

FIG. 3 is a high-level functional block diagram illustrating another example of a synchronization module 300 able to temporally couple data acquired from multiple sources. In this embodiment, the synchronization module 300 is designed to fuse data acquired from a camera 302, an accelerometer 306, a gyroscope 308, and a GPS receiver 310 for the purpose of facilitating real-time observation of an individual. The individual may be, for example, a driver of a vehicle.

Initially, the camera 302 generates a series of images of the individual. The series of images may be representative of a moving image file (also referred to as a "video file") or a collection of still images captured on a periodic basis. The series of images can be streamed to a processor 314 by the camera 302 via an interface that acts as an output mechanism. As these images are transferred to the processor 314, the camera 302 produces two synchronization signals that are accessible via the interface: a horizontal synchronization ($H_{Sync}$) signal that indicates when each line of a given image has been transferred and a synchronization signal (e.g., a vertical synchronization $V_{Sync}$ signal) that indicates when an entire image has been transferred.

As shown in FIG. 3, the $V_{Sync}$ signal may be provided to an inertial sampling circuit 304 (also referred to as an "inertial measurement unit" or "IMU") as input. The motion sensor(s) included in the inertial sampling circuit 304 may use the $V_{Sync}$ signal as input to generate motion data indicative of motion of the synchronization module 300. Here, the inertial sampling circuit 304 includes an accelerometer 306 that produces accelerometer samples when strobed by the $V_{Sync}$ signal and a gyroscope 308 that produces gyroscope samples when strobed by the $V_{Sync}$ signal. Each sample produced by the accelerometer 306 and gyroscope 308 may be a 16-bit signed integer appended with a 12-bit marker indicative of the time that the $V_{Sync}$ signal was registered by the inertial sampling circuit 304. Such a configuration ensures that the samples are generated with an aligned phase marked by the $V_{sync}$ signal. Because the accelerometer 306 and gyroscope 308 generate samples in response to receiving the $V_{Sync}$ signal from the camera 302, the transfer rate of the camera 304 may be substantially identical to the sample rates of the accelerometer 306 and gyroscope 308.

The GPS receiver 310 can be configured to generate a series of location values indicative of the geographical location of the synchronization module 300 at corresponding points in time. Using the series of location values, the GPS receiver 310 can estimate the speed at which the synchronization module 300 is moving. For example, the GPS receiver 310 may produce a series of speed values by calculating, for each location value in the series of location values, a speed value based on the distance between the location value under consideration and the preceding location value and the frequency with which location values are generated by the GPS receiver 310. To calculate the speed value for a given location value, the GPS receiver 310 can divide the distance between the given location value and the preceding location value by the time that elapsed between these location values.

Moreover, the GPS receiver 310 may produce a PPS signal for synchronization purposes. As noted above, the PPS signal is an electrical signal that has a width of less than one second and a sharply rising or abruptly falling edge that accurately repeats once per second. The GPS receiver 310 may also produce a time reference ($T_{Ref}$) signal that is synchronized with a system clock (not shown). The system clock (also referred to as a "clock module") is responsible for issuing a steady, high-frequency signal that synchronizes the various components of the synchronization module 300.

The $V_{Sync}$ signal and PPS signal can be fed into a microcontroller 312 by the camera 302 and GPS receiver 310, respectively. Upon receiving these signals, the microcontroller 312 can compute the phase difference (also referred to as the "phase offset") between the $V_{Sync}$ signal and PPS signal. Because the synchronization module 300 uses a microcontroller 312 to compute the phase difference between these signals, the computation does not incur any software overhead. The microcontroller 312 can append the phase difference (or metadata indicative of the phase difference) to the accelerometer samples generated by the accelerometer 306 and the gyroscope samples generated by the gyroscope 308. Thereafter, the accelerometer and gyroscope samples (with appended phase differences) can be transferred to the processor 314 in the form of fused data. In some embodiments, the accelerometer and gyroscope samples are transferred to the microcontroller 312 as a single digital signal. In other embodiments, the accelerometer and gyroscope samples are transferred to the microcontroller 312 as separate digital signals. In such embodiments, these digital signals may be received by the microcontroller 312 at different input pins.

As shown in FIG. 3, the processor 314 may receive the series of images from the camera 302, the series of speed values and $T_{Ref}$ signal from the GPS receiver 310, and the fused data from the microcontroller 312. Upon receiving an image from the camera 302, the processor 314 may associate the image with a corresponding speed value from the series of speed values. The processor 314 may identify the appropriate speed value in the series of speed values based on the $T_{Ref}$ signal. Moreover, the processor 314 may associate the image with a corresponding accelerometer sample and a corresponding gyroscope sample in the fused data. As noted above, the accelerometer 306 and gyroscope 308 use the $V_{Sync}$ signal as input, so each accelerometer and gyroscope value in the fused data will correspond to a different image in the series of images. Accordingly, each image produced by the camera 302 can be associated with a speed value generated by the GPS receiver 310, an accelerometer sample generated by the accelerometer 306, and a gyroscope sample generated by the gyroscope 308.

Figure 4:
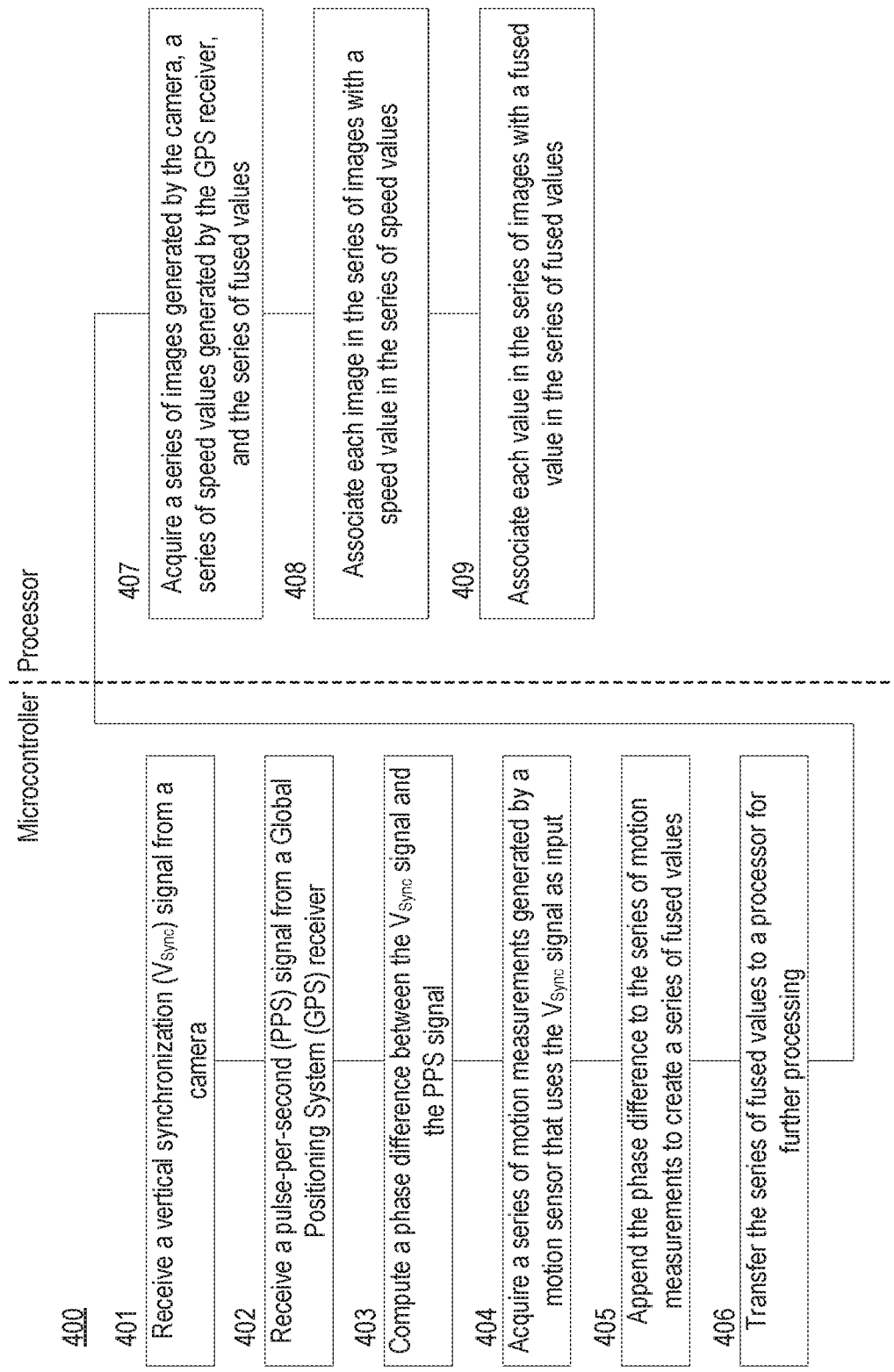
FIG. 4 includes a flow diagram illustrating a process for temporally coupling data generated by a camera, an inertial sampling circuit, and a Global Positioning System (GPS) receiver.

FIG. 4 includes a flow diagram illustrating a process 400 for temporally coupling data generated by a camera, an inertial sampling circuit, and a GPS receiver. Initially, a microcontroller can receive a $V_{Sync}$ signal from a camera that includes a series of discrete signal values (step 401). Each discrete signal value in the series of discrete signal values may be associated with the transfer of an image generated by the camera to a processor. Thus, if the camera is designed to generate 30 frames per second, then the $V_{Sync}$ signal will include roughly 30 discrete signal values per second. The microcontroller can also receive a PPS signal from a GPS receiver (step 402). The microcontroller can then compute a phase difference between the $V_{Sync}$ signal and the PPS signal (step 403). For example, the microcontroller may provide these signals to the input terminals of a two-phase counter with a resolution of at least 32 ns.

The microcontroller can also acquire a series of motion measurements generated by a motion sensor that uses the $V_{Sync}$ signal as input (step 404). The $V_{Sync}$ signal may be used to strobe the motion sensor to ensure that motion measurements are generated by the motion sensor at the same frequency at which images are transferred by the camera. One example of a motion sensor is an inertial sensor, such as an accelerometer, gyroscope, or magnetometer. Generally, the series of motion measurements are streamed directly to the microcontroller from the motion sensor. However, in some embodiments, the series of motion measurements are stored, at least temporarily, in a storage medium before being transferred to the microcontroller.

The microcontroller can append the phase difference to the series of motion measurements to create a series of fused values (step 405). Each fused value may include a motion measurement and a phase difference corresponding to a given point in time. Then, the microcontroller can transfer the series of fused values to the processor for further processing (step 406).

Meanwhile, the processor can acquire the series of images that prompted the generation of the $V_{Sync}$ signal, a series of speed values generated by the GPS receiver, and the series of fused values created by the microcontroller (step 407). Then, the processor can associate each image in the series of images with a speed value from the series of speed values (step 408). Moreover, the processor can associate each image in the series of images with a fused value in the series of fused values (step 409).

Unless contrary to physical possibility, it is envisioned that the steps described above may be performed in various sequences and combinations. For example, the microcontroller may compute the phase difference between the $V_{Sync}$ signal and PPS signal after acquiring the series of motion measurements from the motion sensor.

Other steps may also be included in some embodiments. For example, after performing the process 400 of FIG. 4, the processor may store the series of images (with corresponding speed values, motion values, etc.) in a storage medium. The series of images could be stored in a profile associated with an individual (e.g., a driver) under observation, an entity responsible for requesting the individual be observed, etc. As another example, some embodiments of the synchronization module include multiple motion sensors. In FIG. 3, for instance, the synchronization module includes an accelerometer and a gyroscope. In such embodiments, the microcontroller may receive multiple streams of motion data. For example, accelerometer samples generated by the accelerometer may be received at a first input pin, while gyroscope samples generated by the gyroscope may be received at a second input pin. Accordingly, to produce a fused value, the microcontroller may need to extract a single value from the accelerometer samples and a single value from the gyroscope samples.

Velocity Estimation Based on a Single Source of Image Data

To estimate the velocity of a moving object such as a vehicle, two image sensors are normally required to estimate depth and/or velocity of an object located in the field of view of each image sensor. The synchronization technique described herein, however, enables the velocity of an object to be estimated using a single image sensor. FIG. 5 includes a flow diagram of a process 500 for estimating the velocity of an object based on images created by a single camera. While the object may be referred to as a "moving object," those skilled in the art will recognize that the object may move with respect to the camera, or the camera may move with respect to the object.

Initially, the field of view of the camera is calibrated to a known maximum distance at which the object can be detected (step 501). This may be done automatically by a processor able to examine the context of images produced by the camera. The camera can then capture a series of images that include the object at a known rate (step 502). For example, the camera may have a capture rate of 9 hertz (Hz), 15 Hz, 30 Hz, 60 Hz, etc.

Thereafter, the processor can estimate the rate at which the size of the object is changing by examining the series of images (step 503). More specifically, the processor can examine pixel data associated with the series of images to determine whether the size of object, as determined by pixel count, is increasing, decreasing, or staying roughly the same.

The processor can then compute the speed at which the camera is moving (step 504). For example, the processor may employ an extended Kalman filter (EKF) that considers as input speed and location values generated by a GPS receiver located near the camera. Generally, the GPS receiver generates the speed and location values at the same frequency. For example, the GPS receiver may generate speed and location values at a frequency of 30 Hz, 60 Hz, etc.

Then, the processor can calculate the speed of the object based on the rate at which the size of the object is changing and the speed at which the camera is moving (step 505). More specifically, the processor can estimate the speed of the object based on the rate at which its size is changing across successive images, and then the processor can subtract the speed at which the camera is moving from the estimated speed of the object.

Processing System

Figure 6:
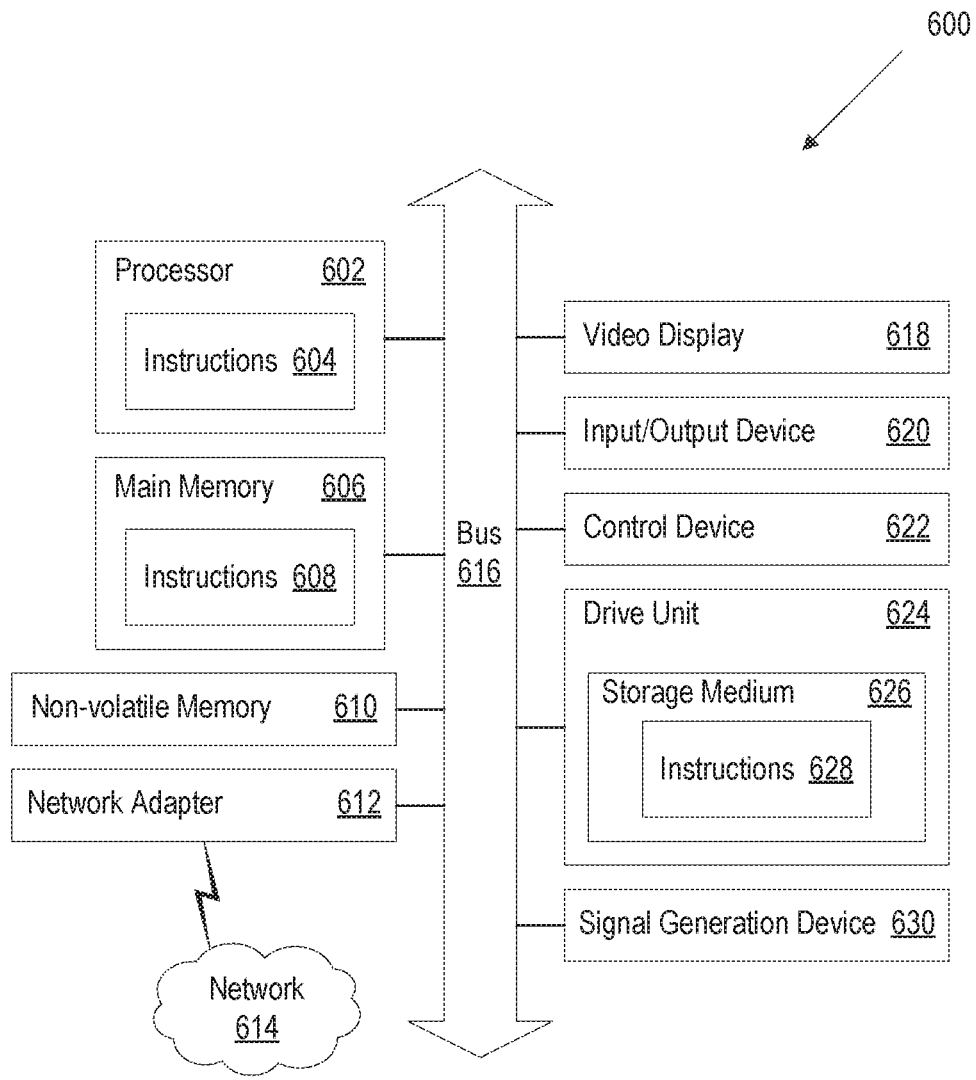
FIG. 6 is a block diagram illustrating an example of a processing system in which at least some operations described herein can be implemented.

FIG. 6 is a block diagram illustrating an example of a processing system 600 in which at least some operations described herein can be implemented. For example, some components of the processing system 600 may be hosted on an observation system that includes a synchronization module (e.g., synchronization module 200 of FIG. 2 or synchronization module 300 of FIG. 3). As another example, some components of the processing system 600 may be hosted on a computer device, such as a mobile phone or a computer server, that is communicatively coupled to an observation system across a network.

The processing system 600 may include one or more processors (e.g., one or more CPUs, one or more processing units, etc.) 602, main memory 606, non-volatile memory 610, network adapter 62612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 600 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 62612 enables the processing system 600 to mediate data in a network 614 with an entity that is external to the processing system 600 through any communication protocol supported by the processing system 600 and the external entity. The network adapter 62612 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 62612 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The following items are exemplary features of embodiments described herein. Each item may be an embodiment itself or may be a part of an embodiment. One or more items described below may be combined with other item(s) in an embodiment.

Item 1: A device includes: a camera configured to capture a series of images, transfer the images to a processor, and generate a first synchronization signal that includes a series of discrete values, wherein each discrete value in the series of discrete values is associated with a transfer of a corresponding image in the series of images from the camera to the processor; an inertial sampling circuit configured to receive as input the first synchronization signal generated by the camera, and generate as output a series of motion measurements indicative of motion of the device; a Global Positioning System (GPS) receiver configured to generate a second synchronization signal; and a microcontroller configured to compute a phase difference between the first synchronization signal and the second synchronization signal, append the phase difference to the motion measurements to create a series of fused data values, and transfer the fused data values to the processor. In some embodiments, the transfer of the images from the camera to the processor may include a transfer of one or more of the images to the processor as one or more of the images are generated (i.e., before the entire series of images is generated). Also, in some embodiments, the inertial sampling circuit may receive one or more discrete values of the first synchronization signal as one or more discrete values are generated (i.e., before the entire series of discrete values is generated). In addition, in some embodiments, the transfer of the fused data values from the microcontroller to the processor may include a transfer of one or more of the fused data values to the processor as one or more of the fused data values are created (i.e., before all of the fused data values in the series are created). Furthermore, in some embodiments, the phase difference includes multiple phase difference values corresponding to respective discrete values in the first synchronization signal. In such cases, the microcontroller is configured to compute one or more of the phase difference values using one or more of the discrete values of the first synchronization as one or more of the discrete values of the first synchronization is generated (i.e., before the entire series of discrete values of the first synchronization signal is generated). Also, in some embodiments, the second synchronization signal may include one or more signals, such as one or more PPS signals.

Item 2: The images in the series form at least a part of a video file.

Item 3: The GPS receiver is further configured to: generate a series of location values indicative of location of the device, and produce a series of speed values by establishing, for each location value in the series of location values, a speed at which the device is moving.

Item 4: The processor is configured to receive the series of images from the camera, the series of fused data values from the microcontroller, and the series of speed values from the GPS receiver, and wherein the processor is configured to associate each image in the series of images with (1) at least one of the motion measurements in the series of fused data values and (2) at least one of the speed values.

Item 5: The inertial sampling circuit comprises an accelerometer, a gyroscope, a magnetometer, or any combination thereof.

Item 6: The inertial sampling circuit includes an accelerometer and a gyroscope, and wherein the series of motion measurements includes a first set of measurements generated by the accelerometer and a second set of measurements generated by the gyroscope.

Item 7: Each motion measurement in the series of motion measurements is generated by the inertial sampling circuit in response to receiving a corresponding one of the discrete values in the first synchronization signal from the camera.

Item 8: The inertial sampling circuit is configured to generate the motion measurements at a frequency of at least 100 kilohertz (kHz).

Item 9: The microcontroller is configured to determine the phase difference between the first synchronization signal and the second synchronization signal using a counter having a resolution of at least 32 nanoseconds (ns).

Item 10: A synchronization module includes: a processor; and a microcontroller configured to: receive a synchronization signal that includes a series of discrete values from a camera, wherein each discrete value in the series of discrete values is associated with a transfer of an image in a series of images generated by the camera, receive a pulse-per-second (PPS) signal from a Global Positioning System (GPS) receiver, compute a phase difference between the synchronization signal and the PPS signal, append the phase difference to a series of motion measurements generated by a motion sensor configured to use the synchronization signal as input, and transfer the motion measurements to the processor. In some embodiments, the microcontroller is configured to receive one or more of the discrete values of the synchronization signal as one or more of the discrete values are generated (i.e., before the entire series of discrete values are generated). Also, in some embodiments, the phase difference includes multiple phase difference values corresponding to one or more discrete values in the first synchronization signal. In such cases, the microcontroller is configured to compute one or more of the phase difference values using one or more of the discrete values of the first synchronization as one or more of the discrete values of the first synchronization is generated (i.e., before the entire series of discrete values of the first synchronization signal is generated). Furthermore, in some embodiments, the PPS signal may include one or more signals.

Item 11: The motion sensor comprises an accelerometer.

Item 12: The motion sensor is one of multiple motion sensors configured to use the synchronization signal as input; and wherein the series of motion measurements include a first set of measurements generated by the one of the motion sensors, and a second set of measurements generated by another one of the motion sensors.

Item 13: The microcontroller is configured to receive the first and second sets of measurements via different input pins.

Item 14: The processor is configured to: receive the series of images generated by the camera, receive a series of speed values generated by the GPS receiver, receive the series of motion measurements from the microcontroller, and associate each image in the series of images with (1) at least one of the motion measurements and (2) at least one of the speed values.

Item 15: The synchronization module is configured to store the series of images, the series of motion measurements, and the series of speed values in a profile.

Item 16: The profile is associated with an individual captured in at least one image in the series of images.

Item 17: A method for coupling streams of data to be analyzed in real time, includes: receiving, by a microcontroller, a synchronization signal that includes a series of discrete values, wherein each discrete value in the series of discrete values is associated with a transfer of an image in a series of images generated by a camera; receiving, by the microcontroller, a pulse-per-second (PPS) signal generated by a Global Positioning System (GPS) receiver; computing, by the microcontroller, a phase difference between the synchronization signal and the PPS signal; receiving, by the microcontroller, a series of motion measurements generated by an inertial sampling circuit configured to use the synchronization signal as input; creating, by the microcontroller, a series of fused data values by appending the phase difference to the series of motion measurements; transferring, by the microcontroller, the fused data values to a processor. In some embodiments, the actions in the method do not need to be performed one after the other, and may be performed simultaneously. Also, in some embodiments, part of an action in the method may be performed between parts of another action in the method. In addition, in some embodiments, the microcontroller may receive one or more discrete values of the synchronization signal as one or more discrete values are generated (i.e., before the entire series of discrete values of the synchronization signal is generated). Also, in some embodiments, the microcontroller may compute phase difference values of the phase difference using one or more discrete values of the synchronization signal as one or more discrete values of the synchronization signal are generated (i.e., before the entire series of discrete values of the synchronization signal is generated). Furthermore, in some embodiments, the microcontroller may receive one or more of the motion measurements as one or more of the motion measurements are generated (i.e., before the entire series of motion measurements is generated). In addition, in some embodiments, the microcontroller may create one or more of the fused data values as one or more phase difference values of the phase difference are computed, and as one or more of the motion measurements are received by the microcontroller.

Item 18: Each fused data value in the series of fused data values includes a 16-bit signed integer indicative of a corresponding one of the motion measurements, and a 12-bit marker indicative of a time at which the synchronization signal was registered by the inertial sampling circuit.

Item 19: The microcontroller employs a counter having a resolution of at least 32 nanoseconds (ns) to compute the phase difference between the synchronization signal and the PPS signal.

Item 20: The method further includes: receiving, by the processor, the series of images generated by the camera; receiving, by the processor, a series of speed values generated by the GPS receiver; receiving, by the processor, the series of fused data values from the microcontroller; and associating, by the processor, each image in the series of images with (1) at least one of the fused data values and (2) at least one of the speed values.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A device comprising:
  a camera configured to
    capture a series of images,
    transfer the images to a processor, and
    generate a first synchronization signal that includes a series of discrete values,
      wherein each discrete value in the series of discrete values is associated with a transfer of a corresponding image in the series of images from the camera to the processor;
  an inertial sampling circuit configured to
    receive as input the first synchronization signal generated by the camera, and
    generate as output a series of motion measurements indicative of motion of the device;
  a Global Positioning System (GPS) receiver configured to generate a second synchronization signal; and
  a microcontroller configured to
    compute a phase difference between the first synchronization signal and the second synchronization signal,
    append the phase difference to the motion measurements to create a series of fused data values, and
    transfer the fused data values to the processor.

2. The device of claim 1, wherein the images in the series form at least a part of a video file.

3. The device of claim 1, wherein the GPS receiver is further configured to:
  generate a series of location values indicative of location of the device, and
  produce a series of speed values by establishing, for each location value in the series of location values, a speed at which the device is moving.

4. The device of claim 3, wherein the processor is configured to receive the series of images from the camera, the series of fused data values from the microcontroller, and the series of speed values from the GPS receiver, and
  wherein the processor is configured to associate each image in the series of images with (1) at least one of the motion measurements in the series of fused data values and (2) at least one of the speed values.

5. The device of claim 1, wherein the inertial sampling circuit comprises an accelerometer, a gyroscope, a magnetometer, or any combination thereof.

6. The device of claim 1, wherein the inertial sampling circuit includes an accelerometer and a gyroscope, and wherein the series of motion measurements includes a first set of measurements generated by the accelerometer and a second set of measurements generated by the gyroscope.

7. The device of claim 1, wherein each motion measurement in the series of motion measurements is generated by the inertial sampling circuit in response to receiving a corresponding one of the discrete values in the first synchronization signal from the camera.

8. The device of claim 7, wherein the inertial sampling circuit is configured to generate the motion measurements at a frequency of at least 100 kilohertz (kHz).

9. The device of claim 1, wherein the microcontroller is configured to determine the phase difference between the first synchronization signal and the second synchronization signal using a counter having a resolution of at least 32 nanoseconds (ns).

10. A synchronization module comprising:
  a processor; and
  a microcontroller configured to:
    receive a synchronization signal that includes a series of discrete values from a camera,
      wherein each discrete value in the series of discrete values is associated with a transfer of an image in a series of images generated by the camera,
    receive a pulse-per-second (PPS) signal from a Global Positioning System (GPS) receiver,
    compute a phase difference between the synchronization signal and the PPS signal,
    append the phase difference to a series of motion measurements generated by a motion sensor configured to use the synchronization signal as input, and
    transfer the motion measurements to the processor.

11. The synchronization module of claim 10, wherein the motion sensor comprises an accelerometer.

12. The synchronization module of claim 10, wherein the motion sensor is one of multiple motion sensors configured to use the synchronization signal as input; and
  wherein the series of motion measurements include a first set of measurements generated by the one of the motion sensors, and a second set of measurements generated by another one of the motion sensors.

13. The synchronization module of claim 12, wherein the microcontroller is configured to receive the first and second sets of measurements via different input pins.

14. The synchronization module of claim 10, wherein the processor is configured to:
  receive the series of images generated by the camera,
  receive a series of speed values generated by the GPS receiver,
  receive the series of motion measurements from the microcontroller, and
  associate each image in the series of images with (1) at least one of the motion measurements and (2) at least one of the speed values.

15. The synchronization module of claim 14, wherein the synchronization module is configured to store the series of images, the series of motion measurements, and the series of speed values in a profile.

16. The synchronization module of claim 15, wherein the profile is associated with an individual captured in at least one image in the series of images.

17. A method for coupling streams of data to be analyzed in real time, the method comprising:
  receiving, by a microcontroller, a synchronization signal that includes a series of discrete values, wherein each discrete value in the series of discrete values is associated with a transfer of an image in a series of images generated by a camera;

receiving, by the microcontroller, a pulse-per-second (PPS) signal generated by a Global Positioning System (GPS) receiver;

computing, by the microcontroller, a phase difference between the synchronization signal and the PPS signal;

receiving, by the microcontroller, a series of motion measurements generated by an inertial sampling circuit configured to use the synchronization signal as input;

creating, by the microcontroller, a series of fused data values by appending the phase difference to the series of motion measurements;

transferring, by the microcontroller, the fused data values to a processor.

18. The method of claim 17, wherein each fused data value in the series of fused data values includes a 16-bit signed integer indicative of a corresponding one of the motion measurements, and a 12-bit marker indicative of a time at which the synchronization signal was registered by the inertial sampling circuit.

19. The method of claim 17, wherein the microcontroller employs a counter having a resolution of at least 32 nanoseconds (ns) to compute the phase difference between the synchronization signal and the PPS signal.

20. The method of claim 17, further comprising:

receiving, by the processor, the series of images generated by the camera;

receiving, by the processor, a series of speed values generated by the GPS receiver;

receiving, by the processor, the series of fused data values from the microcontroller; and associating, by the processor, each image in the series of images with (1) at least one of the fused data values and (2) at least one of the speed values.

* * * * *